(12) United States Patent
Määttä et al.

(10) Patent No.: US 8,623,260 B2
(45) Date of Patent: Jan. 7, 2014

(54) MOULD SYSTEM FOR CHANGING THE DEPTH OF A CARDBOARD-BASED CONTAINER

(75) Inventors: Päivi Määttä, Imatra (FI); Panu Tanninen, Lappeenranta (FI); Olavi Pirttiniemi, Kärkölä (FI); Noora Nylander, Lahti (FI); Jalliina Järvinen, Lahti (FI); Teemu Karhu, Lahti (FI)

(73) Assignee: Stora Enso Oyj, Helsinki (FI)

( * ) Notice: Subject to any disclaimer, the term of this patent is extended or adjusted under 35 U.S.C. 154(b) by 665 days.

(21) Appl. No.: 12/743,845

(22) PCT Filed: Aug. 12, 2009

(86) PCT No.: PCT/FI2009/050657
§ 371 (c)(1),
(2), (4) Date: May 20, 2010

(87) PCT Pub. No.: WO2010/018306
PCT Pub. Date: Feb. 18, 2010

(65) Prior Publication Data
US 2010/0270701 A1  Oct. 28, 2010

(30) Foreign Application Priority Data
Aug. 12, 2008  (FI) ..................... 20080463

(51) Int. Cl.
*B29C 43/02*  (2006.01)

(52) U.S. Cl.
USPC ........... 264/330; 264/319; 264/320; 264/325; 264/328.7; 425/3; 425/195; 425/466; 249/155; 249/156; 249/157; 249/158; 249/159

(58) Field of Classification Search
USPC ............ 425/3, 195, 466, DIG. 33; 264/328.7, 264/319, 320, 325, 330; 249/155, 156, 157, 249/158, 159
See application file for complete search history.

(56) References Cited

U.S. PATENT DOCUMENTS 2,136,308 A * 11/1938 Miller ........................ 493/152
3,119,540 A    1/1964  Schenk et al.

(Continued)

FOREIGN PATENT DOCUMENTS

EP    0951990 A2   10/1999
GB    1 587 457    4/1981

(Continued)

OTHER PUBLICATIONS

JPO English machine translation for JP 09207173, retrieved Jan. 31, 2013.*

(Continued)

*Primary Examiner* — Timothy Kennedy
(74) *Attorney, Agent, or Firm* — Birch, Stewart, Kolasch & Birch, LLP

(57) ABSTRACT

Mold system (1) for manufacturing cardboard-based container, comprising movable mold half (10) and stationary mold half (20) located opposite one another. Movable mold half (10), movable with respect to stationary mold half (20), includes at least a core plate (4), a plate-like seal ring (5) movable with respect to the core, and collar ring (6). Stationary mold half (40) includes at least a mold plate (7) provided with a mold cavity (71) and a seal surface (7a). In the mold system (1), an insert (720) can be supported on and detachably attached to the base (71b) of the mold cavity (71) reducing the depth H of the mold cavity by its height h. Container (500) comprises bottom (57) pressed from cardboard blank and wall (59) connected to the bottom and plastic rim (50) connected to the upper edge of the walls.

10 Claims, 6 Drawing Sheets

(56) References Cited

U.S. PATENT DOCUMENTS

| | | | |
|---|---|---|---|
| 3,436,008 A | | 4/1969 | Santangelo |
| 4,127,378 A | * | 11/1978 | Meadors ............... 425/398 |
| 4,149,841 A | * | 4/1979 | Patterson ............... 425/398 |
| 4,381,278 A | * | 4/1983 | Ingraffea ............... 425/387.1 |
| 4,705,471 A | | 11/1987 | Shah et al. |
| 5,238,640 A | * | 8/1993 | Masui et al. ............... 264/266 |
| 5,425,972 A | | 6/1995 | Calvert |
| 6,616,586 B2 | * | 9/2003 | Dai ............... 493/158 |
| 6,981,863 B2 | * | 1/2006 | Renault et al. ............... 425/510 |
| 2004/0262322 A1 | | 12/2004 | Middleton et al. |
| 2005/0159284 A1 | | 7/2005 | Smith et al. |
| 2007/0267374 A1 | | 11/2007 | Middleton et al. |

FOREIGN PATENT DOCUMENTS

| | | | |
|---|---|---|---|
| JP | 54-116059 A | | 9/1979 |
| JP | 09207173 A | * | 8/1997 |
| JP | 2000-335550 A | | 12/2000 |
| JP | 3158287 B2 | * | 4/2001 |
| WO | WO 00/21854 A1 | | 4/2000 |
| WO | WO 01/76976 A1 | | 10/2001 |
| WO | WO 03/033258 A1 | | 4/2003 |
| WO | WO 2009/074721 A1 | | 6/2009 |

OTHER PUBLICATIONS

JPO English machine translation for JP 3158287, retrieved Feb. 2, 2013.*

* cited by examiner

MOULD SYSTEM FOR CHANGING THE DEPTH OF A CARDBOARD-BASED CONTAINER

The invention relates to a mould system according to the preamble of claim 1 for changing the depth of a cardboard-based container, wherein the mould system includes a movable mould half and a stationary mould half, which mould halves are located opposite to each other; and the mould system can be used to manufacture a container that comprises a bottom, which is pressed from a cardboard blank, walls that are connected to the bottom and a (plastic) rim that is at least partly moulded from plastic and connected to the upper edge of the walls, encircling the walls.

In food industry, in particular, so-called tray packages are used as storage packages, consisting of lidded containers that have a bottom, walls that encircle the bottom and extend upwards, and a rim that encircles the upper edge of the walls and extends outwards. The container is closed with a lid that is connected to the rim. In such containers, the material of the container bottom and walls often comprise cardboard, on top of which plastic and/or metal layers may be added, which change the steam and/or oxygen transmission properties of the cardboard depending on the application.

Generally, such a so-called tray package is used for storing foodstuffs, whereby it is closed hermetically by the lid. To be able to attach the lid to the package, the edge of the container that is used as tray package must be provided with a horizontal rim, which protrudes from the upper end of the side walls and encircles the package. On the upper surface of the rim, there is usually a suitable coating by means of which the lid can be fastened tightly to the package. For example, it is very common to use heat-sealable plastic materials for fastening the lid part to the package. As examples of food packages and packaging materials used therein, among others, the patent specifications WO-03/033258, EP-1289856, WO-00/21854 and U.S. Pat. No. 5,425,973 could be mentioned.

Such a container with the shape of a tray, comprising a bottom pressed from a cardboard blank, walls that are connected to the bottom and a rim, that is at least partly cast of plastic and connected to the upper edge of the walls, encircling the walls can be formed by various methods. The published application FI 20070973 describes a manufacturing method of a tray package, wherein the container is formed from a straight cardboard blank by pressing to shape in a mould system which includes a movable mould half and a stationary mould half, which are located opposite to each other, whereby the mould part that is movable with respect to the stationary mould part includes at least a core plate provided with a core, a plate-like seal ring, which is movable with respect to the core and has a seal surface and surrounds the core, and a collar ring, which can be moved with respect to the core and the seal ring and is fitted between the same, and which can be used to form the rim on the container; and the stationary mould half includes at least a mould plate provided with a mould cavity and a seal surface.

A cardboard blank that is pressed to shape by such a mould system is brought on top of the mould cavity of the stationary mould half, the core of the movable mould half settles into the mould cavity, and the cardboard blank remaining between the core and the mould cavity is moulded into a container with the shape of a tray. At the end stage of the compression moulding, a rim of plastic material extending sideways is moulded to the upper part of the side walls of the package, when the mould is kept closed in such a way that a mould cavity corresponding to the rim is formed by moving a counter surface inside the mould system backwards from a surface opposite to it, after which the casting material is introduced into the mould cavity. In the cavity, the material solidifies into a fixed rim, after which the mould is opened and the finished container-shape package is removed from the mould.

With the prior art above as basis, the object of the applicant was to provide a more versatile manufacturing method of tray packages, wherein the same mould system could be used to manufacture various containers, which are used as tray packages and provided with one or more partitions or wherein the cardboard-based body of the container could be provided with various embossed or inlaid shapes.

Surprisingly, it has now been observed that by modifying the mould cavity and/or the (forming) core of the mould system described above by various inserts that are placed in the mould cavity and/or attachments that are detachably placed in the forming core, or cores, which are detachably attached to the core plate and the length of which can be changed, the depth of the container that is manufactured can be modified as desired.

To be more precise, the invention relates to a mould system according to claim 1 for changing the depth of a cardboard-based container. Such a mould system includes a movable mould half and a stationary mould half, which are located opposite to each other; the mould system can be used to manufacture a container which comprises a bottom that is pressed from a cardboard blank, walls that are connected to the bottom and a rim that is at least partly cast of plastic and connected to the upper part of the walls, encircling the walls, whereby the mould that is movable with respect to the stationary mould includes at least a core plate provided with a core, a plate-like seal ring that is movable with respect to the core and comprises a seal surface and surrounds the core, and a collar ring, which can be fitted between the core and the seal ring and which can be used to form the rim on the container and which can be moved with respect to both the seal ring and the core; and the stationary mould part includes at least a mould plate provided with a mould cavity and a seal surface. In the mould system, an insert can be supported on and detachably attached to the base of the mould cavity, reducing the depth of the mould cavity by its height h, so that the continuous surface of the insert works as a new bottom of the mould cavity and that the length H of the core part that penetrates inside the mould cavity at the pressing stage of the cardboard blank can be shortened, respectively, by the height h of the insert either by replacing the core in the core plate with a shorter one or by detachably attaching to the basic part of the core, the length of which does not change, an attachment the length of which can be changed, whereby the core or attachments of the core and the inserts of the base of the mould cavity, which correspond to each other can be used to change the depth of the cardboard blank that is being manufactured, i.e., the distance of the container bottom, which is pressed from the cardboard blank, from the upper edges of the walls.

In an embodiment of the invention, the insert that is attached to the base of the mould cavity can be used to form a one or two-sided inlay or embossing on the cardboard-based body of the container.

The base herein refers to the plane of the mould cavity, by which a container can be made, the depth of which, i.e., the distance of the bottom from the rim is the greatest.

In this context, the longitudinal direction of the insert of the mould cavity and the longitudinal direction of the core refer to a dimension perpendicular to the bottom of the formed container, which is also the depth direction of the container thus formed.

The one-sided inlaid of embossed patterns or shapes of the body refer to the recesses or bulges that are formed on one surface of the body only. The two-sided inlaid or embossed patterns or shapes of the body refer to the recesses or bulges that go through the body that is pressed from cardboard, whereby a recess on one side of the body always corresponds to a bulge of a similar size and shape on the opposite side of the body.

In the method according to the invention, the cardboard blank is pressed between the (forming) core and the bottom of the mould cavity to make the container bottom and the walls that encircle the bottom, whereafter a flange-like rim that at least partly consists of plastic and encircles the walls is formed on the upper edges of the walls by casting. The insert, which is attached to the bottom of the mould cavity, and the core, which is attached to the core plate and the length of which changes, or the attachment the length of which changes and which is connected to the basic part of the core that does not change its length, are used to change the distance of the container bottom, which is pressed from the cardboard blank, from the upper edges of the container walls.

Using a corresponding method, one or two-sided inlaid or embossed patterns can be formed on the cardboard-based body of the container.

The invention is based on the fact that the length of the forming core on the core plate is changed, or an attachment, the length of which changes, is added onto the basic part of the forming core, the length of which does not change, and simultaneously, a detachable insert, the length of which can be changed, is added onto the base of the mould cavity. Thus, the inserts or the attachment of the core can either be used to increase or decrease the depth of the container, i.e., the distance of the bottom from the rim. If the depth of the container that is made is to be decreased, an insert that reduces the depth of the mould cavity is attached to the base of the mould cavity and, at the same time, the forming core is shortened by reducing the length of the attachment that is connected to the end of the core basic part, to an extent that corresponds to the decrease in depth of the mould cavity. In this way, the surface area of the tray bottom can be kept as before regardless of the changes in the depth of the tray.

The patent specification US 2007/0267374, FIGS. 161-163, discloses baffle plates that are placed in the mould cavity and connected to the walls of the mould cavity, however, these baffle plates are mainly used for positioning the container that is made into the mould cavity and not to adjust the depth of the container, which is why they differ as to both their structure and their function from the inserts placed in the mould cavity of the mould system according to the invention.

Furthermore, the manufacturing method described in the patent specification mentioned above cannot provide the cardboard-based containers with wide plastic rims as, contrary to the invention, the casting cavity therein is already formed during the moulding of the blank, whereby the retention of the edges of the cardboard, which ensures an even creasing, stops too early. In the invention, the cardboard blank is retained between the seal surface of the seal ring and the seal surface of the collar ring and the seal surface of the mould plate opposite to them at least until the cardboard blank has slid into the mould cavity, and the casting cavity is not made in the mould system until after this by pulling the collar ring backwards, i.e., moving it away from the stationary front mould to provide the flange-like rim that at least partly consists of plastic and encircles the walls of the container.

In an embodiment of the invention, the insert, which are provided with bulges and inlays of the surface and connected to the mould cavity or the forming core, correspondingly mould the cardboard blank when the forming core is pressed to the bottom of the mould cavity at the forming stage of the body.

By using the detachable inserts and attachments, the shape and dimensions of the container body that is manufactured can be changed considerably quicker than by replacing the entire core plate or mould plate with a new core plate mould plate. In this way, the mould system becomes modular and changes are easy and simple to make without changing the operation of the entire mould system.

The preferred embodiments of the invention are illustrated by the appended figures, their description also disclosing other advantages provided by the invention.

In the following, the mould system 1 is essentially described first and the operation of the mould system 1 by FIGS. 1-3. Regarding the collar ring and the seal ring, the mould systems shown in FIGS. 2A and 2B are not the same as those used in the invention, but they can illustrate the basic structure of the mould system according to the invention.

Figure 1:
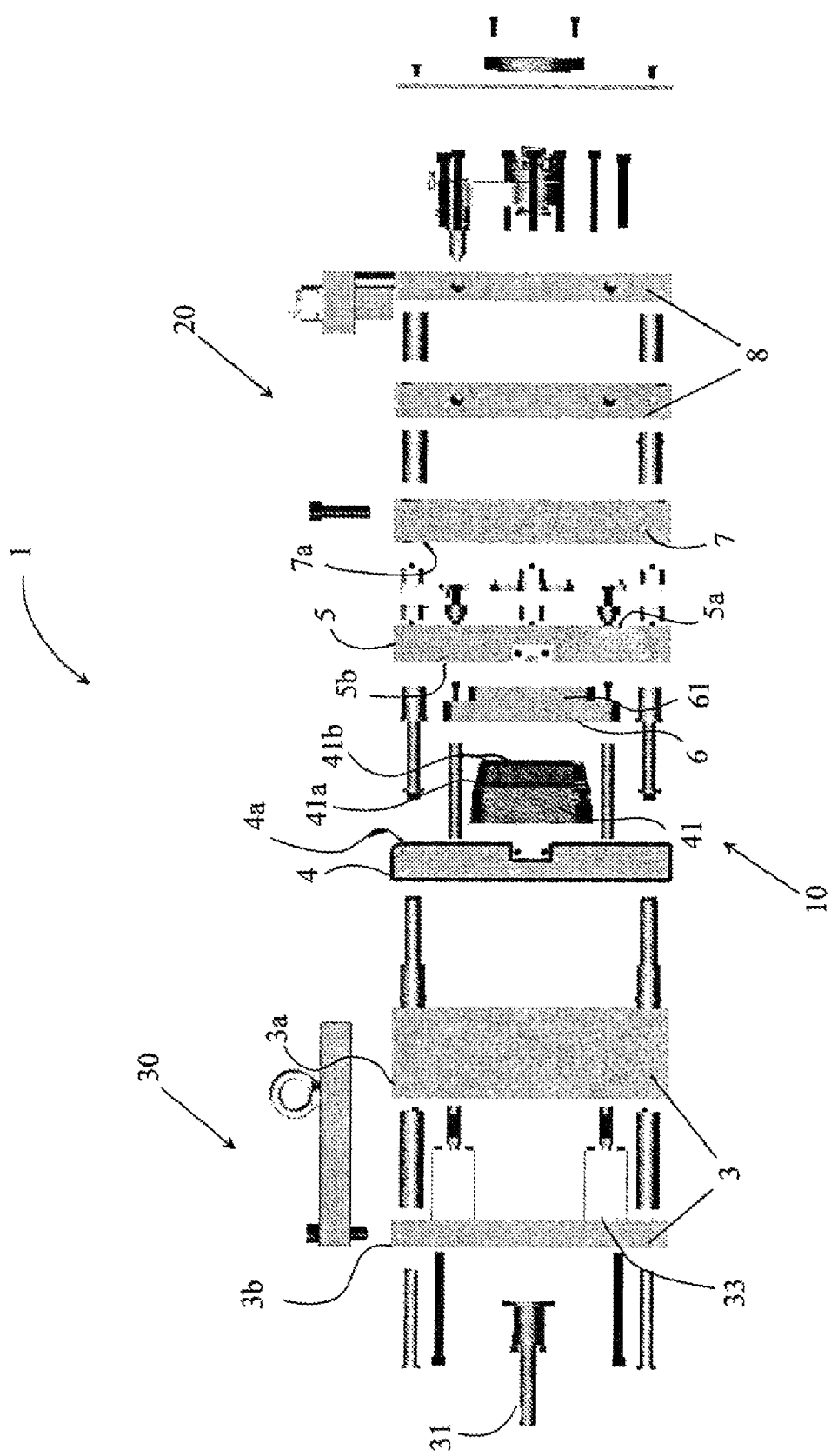
FIG. 1 shows an exploded side view of the mould system in cross section.
Figure 2A:
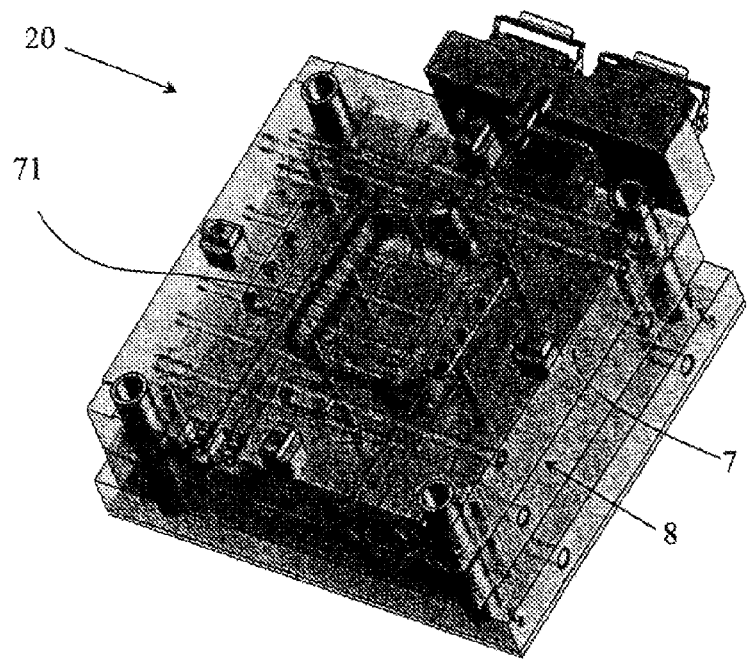
FIGS. 2A and 2B show a perspective view of a mould system according to the prior art.
Figure 2B:
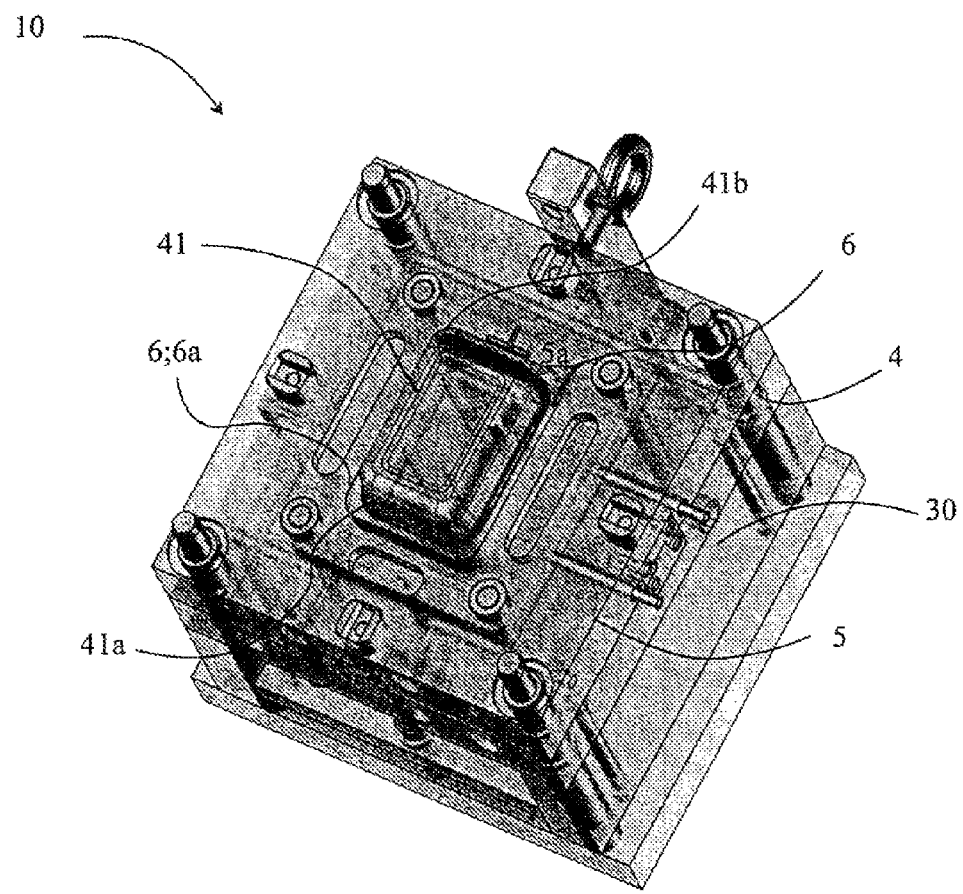

FIG. 1 shows an exploded view of the main parts of the mould system according to the invention as viewed from the side and in cross section. The mould system 1 includes a movable mould half 10 or "rear mould" and a stationary mould half 20 or "front mould". The main parts of the movable mould half 10 comprise and ejection part 30 that comprises and ejection bar 31 and the two-piece body 3 of the ejection part, which comprises, between the parts 3a, 3b of the body, a pneumatic actuator 33 for providing compression between the moulds halves 10 and 20. The movable mould half 10 further includes a plate-like seal ring 5, a plate-like collar ring 6 and a core plate 4, to which a (forming) core 41 is attached. The stationary mould half 20 includes a mould plate 7, which comprises a mould cavity 71 against which the planar cardboard blank is shaped and which determines the general shape of the package (bottom, shape of side walls extending from bottom, inclination of walls, roundings etc.) The cardboard blank herein refers to a cardboard blank or a cardboard-based blank, wherein the cardboard is possibly coated with layers of plastic or metal to change its barrier properties. Furthermore, the stationary mould half 20 includes a mould frame 8, through which casting conduits are conveyed to the casting spot of the rim in a manner better shown in FIGS. 2A and 2B.

The seal ring 5 is located annularly around the forming core 41. A collar ring 6, which is movable in the depth direction with respect to the seal ring 5 and the forming core 41, can be arranged between the seal ring 5 and the forming core 41. The depth direction herein refers to a direction perpendicular to the surface 4a of the core plate 4. The seal ring 5 comprises a seal surface 5a, which becomes flush with the face 41a of the moulding part of the core 41 at the end of the pressing stage. The face of the moulding part refers to the part of the core 41, which comes to the plane of the rim of the formed container, i.e., about to the plane of the seal surface 7a of the mould plate 7 and, at the same time, to the plane of the upper edge of the mould cavity 71. The moulding part of the forming core 41 shown in FIG. 1 is the part of the core 41, which can be fitted into the mould cavity 71. The moulding part of the forming core 4 shown in FIG. 1 and the corresponding mould cavity 71 have cross-sectional profiles of the shape of a rounded rectangle, whereby they can provide, correspondingly, a container that has a cross section of a rounded rectangle, which is shown in FIG. 5A, for example. The cross-sectional profiles of the mould cavity, forming core and container refer to the cross sections as examined in the depth direction of the mould system 1, i.e., perpendicular to the surface plane of the mould plate 7 and the core plate 4. If the cross-sectional profiles of the moulding part of the forming core and the mould cavity are changed, e.g., into the form of a circle, containers with a circular cross section are obtained respectively, as shown, e.g., in FIG. 2C.

The seal surface 5a of the seal ring 5 is opposite to the corresponding seal surface 7a of the mould plate 7 that surrounds the mould cavity 71 of the front mould 20. The core 41 is further surrounded by the collar ring 6, which is capable of carrying out a short reciprocating motion with respect to the seal surface 5a of the seal ring 5, and the seal surface 61a of the collar 61 of the collar ring 6 that is turned to the stationary mould half 20 can be moved to the plane of the seal surface 5a of the seal ring 5 and to a very short distance backwards from it.

FIG. 2A shows the stationary mould half 20 that is used in a known mould system 1B and FIG. 2B shows the corresponding movable mould half. Regarding its functions and its mould structure, this mould system 1B is of the same type as the one according to the invention, its structure mainly deviating from the mould system according to the invention with respect to the seal ring 5 that surrounds the core 41 and the structure of the collar ring 6. In the stationary mould half 20, in its front, there is a mould plate 7 that comprises a recess with the shape of a tray, i.e., the mould cavity 71. The mould plate 7 of the stationary mould half 20 is attached to the mould frame 8, through which the casting conduits or hot channels and nozzles are conveyed for introducing the plastic into the ceiling cavity described later on. The movable mould half 10, in turn, comprises in the front the forming core 41, which is attached to the core plate 4 below the same. The core plate 4 is attached to the ejection part 30 of the movable mould half 10. The core 41 is surrounded by the plate-like collar ring 6, which extends to the plane of the face 41a of the core moulding part and the seal surface 61a of which is flush with the face of the core and by the plate-like seal ring 5, which comprises the seal surface 5a and is outside the collar ring and limited to the collar ring.

Figure 3A:
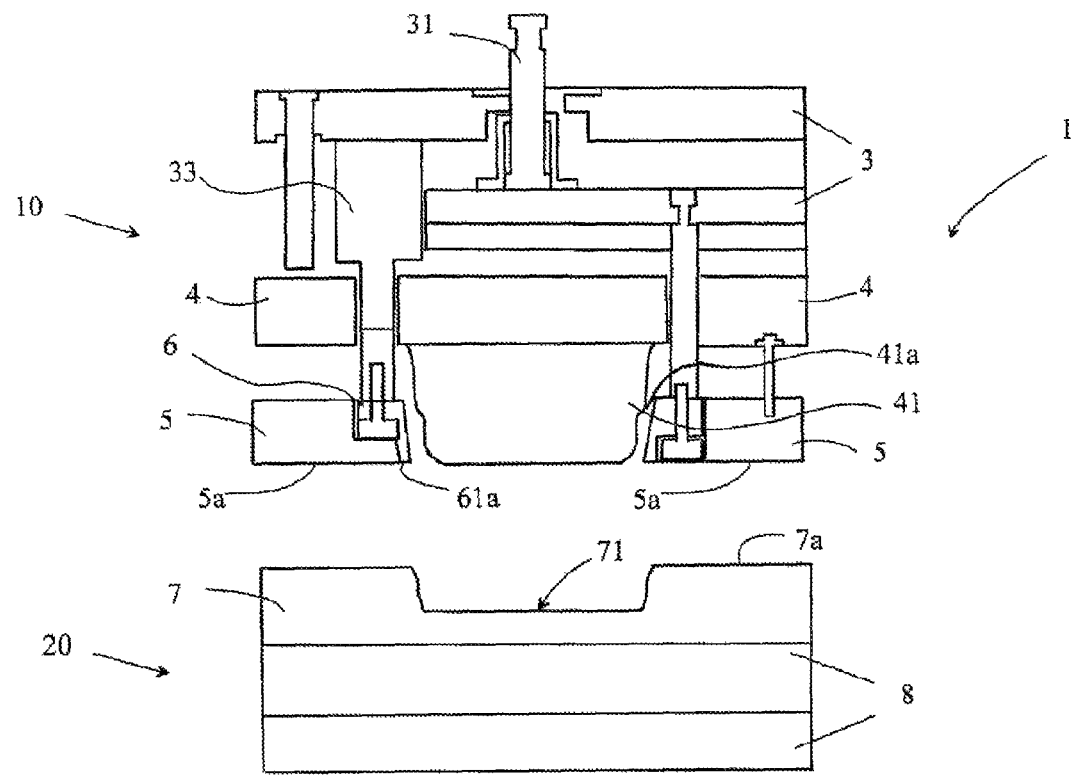
FIGS. 3A-3D show a longitudinal section of the operation of the mould system at the manufacturing stages of the various parts of the container.
Figure 3B:
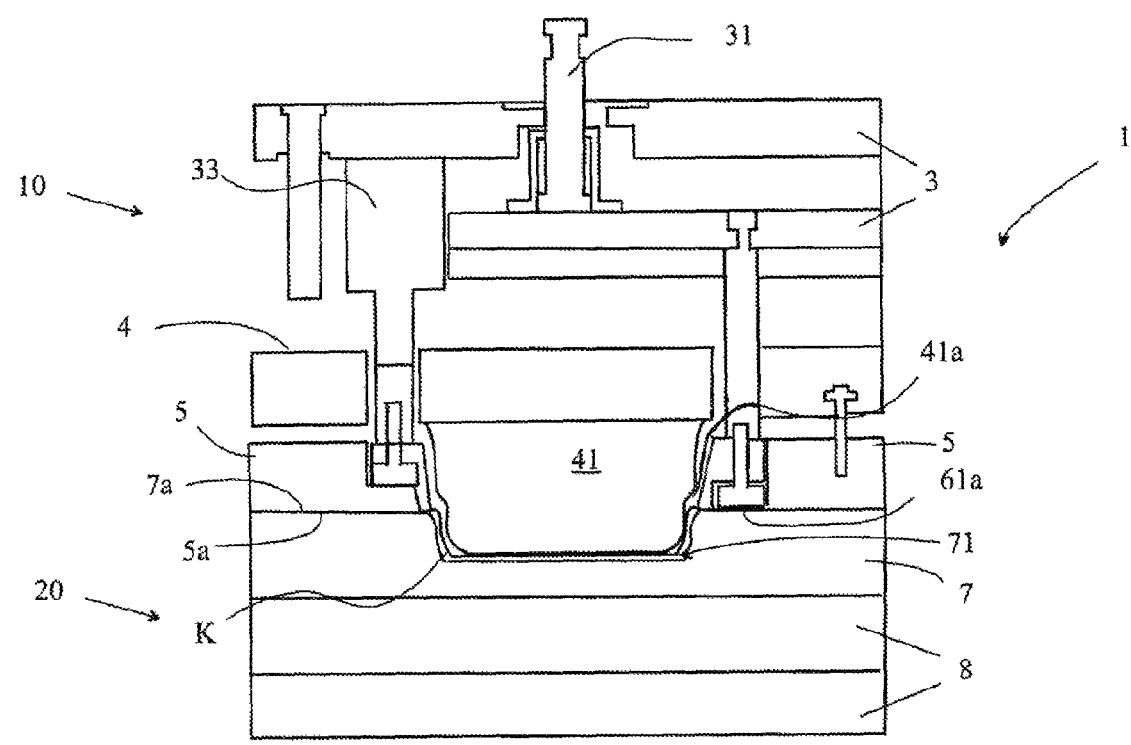

FIGS. 3A-3B show a cross-sectional side view of the mould system 1 according to the invention, its mould halves being the same as those described above by means of FIGS. 1, 2A and 2B. The mould system 1 is used for forming the tray package, starting from pressing the package and ending in casting the rim. The mould system 1 comprises a mould for compression moulding and casting, which is formed from two mould halves 10, 20 and the purpose of which is, at a first stage, to mould a container-shape tray package from an essentially straight and uniform cardboard blank K. A casting function is also integrated into the mould system 1 for casting a rim 50 on the edges of the walls of the package 500 that is shaped by compression.

When the seal surface 61a of the collar 61 of the collar ring 6, i.e., the face 61a that is turned to the stationary mould half 20 is flush with the seal surface 5a of the seal ring 5, a common seal surface is formed by the seal surface 5a of the seal ring and the face of the seal surface 61 of the collar 61. When the mould is closed (the mould halves 10 and 20 are brought together) according to FIGS. 3B-3D, the seal surface 7a of the mould plate 7 of the stationary mould half 20 and the common seal surface 5a, 61a of the movable mould half 10 come against each other so that the cardboard blank K to be shaped remains between them. The pneumatic actuator 33 between the parts 3a, 3b of the body 3 of the ejection part 30 is connected to the collar ring 6 and it pressurizes, through the collar ring 6, the seal ring 5 and, thus, the common seal surface 5a, 61a of the movable mould half 10 to provide a holding force between the mould halves 10 and 20, i.e., between the common seal surface 5a, 61a and the seal surface 7a of the stationary mould half. The main part of the compression or holding force exerted on the seal surface 7a and, besides, on the cardboard blank K between the seal surfaces, is generated by the seal surface 5a of the seal ring 5, but the seal surface 61a of the collar 61 of the collar ring also exerts holding force on the cardboard blank K. The holding force can be adjusted by means of the actuator 33, such as a compressed air cylinder that works on a pressure medium. The collar ring 6 is located inside the ejection part 3 between the seal ring 5 and the core 41.

The two-piece body 3 of the ejection part 30 and the core plate 4 that comprises the core 41 can be moved by the ejection bar 31 in the depth direction with respect to the stationary mould half 20, whereby the depth direction means the same as above. The movable mould half 10 thus moves between a front position (shown in FIG. 3A) and a rear position (shown in FIGS. 3B-3D).

At the compression stage, the movable mould half 10 in the mould system presses the cardboard blank K into the mould cavity 71 of the mould plate 7 of the stationary mould half 20. For this, the movable mould half comprises the forming core 41 that is located on the core plate 4, its forming part fitting into the above-mentioned mould cavity 71 up to the face 41a of the core, so that the cardboard blank is pressed between the core 41 and the cavity 71, obtaining its tray shape. The movable mould half 10 is arranged to move with respect to the stationary mould to close and open the mould by arrangements that are not described herein in detail.

FIG. 3A shows the mould system 1 before closing the mould. The cardboard blank K is brought by a robot to the small holders (not shown) on the mould plate 7 of the stationary mould half 20. After this, the mould is closed, i.e., the core 41 settles into the mould cavity 71 and the cardboard blank K remaining between them is pressed into a tray-shape container.

The stage, at which the core 41 begins to shape the blank after settling into the cavity 71, is shown in FIG. 3B. The seal surfaces, i.e., the seal surface 5a of the seal ring and the seal surface 61a of the collar ring lean on the cardboard blank K by the force of the actuator 33 and retain the blank K at its edges and the compression stage between the said seal surfaces 5a and 61a and the seal surface 7a of the mould plate 7 of the stationary mould half.

Figure 3C:
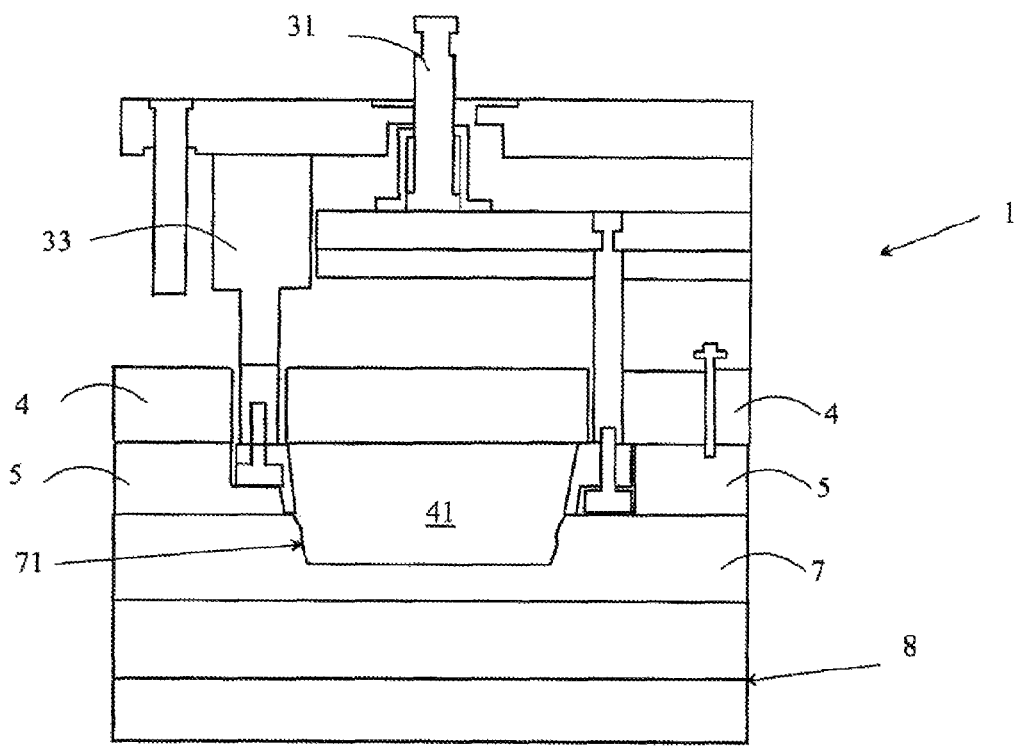

FIG. 3C shows a situation, where the mould is fully closed, the mould halves 10 and 20 being pressed against each other and the cardboard blank K between them being pressed into a tray, so that the upper edge of the side walls of the tray is flush with the seal surface 61a of the collar ring 6 or slightly in front of it. The last holding force on the edges of the blank is caused by the face 61a of the collar 61 of the collar ring 6, against which there is the seal surface 7a of the mould plate that surrounds the cavity 71 of the stationary mould half.

Figure 3D:
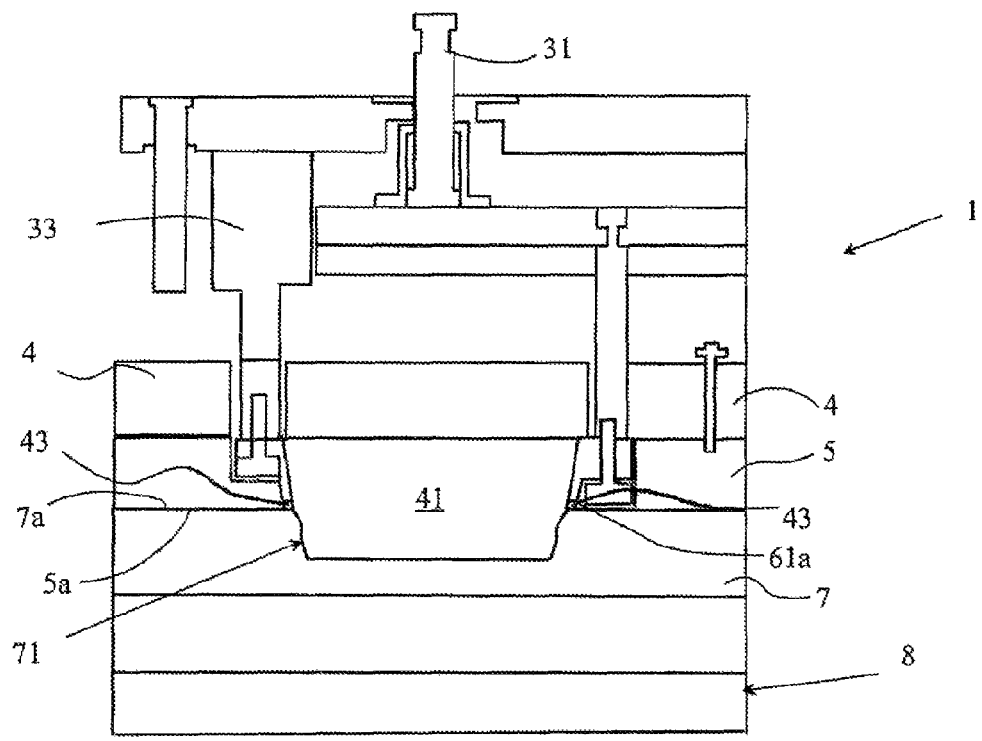

FIG. 3D shows a situation, where the mould is still closed, but the collar ring 6 has moved a short distance, backwards from the seal surfaces 71a of the stationary mould half 20, i.e., in the direction of the ejection part 3 of the movable mould half 10. The movement is provided by an actuator performing precise movements, e.g., by pulling the ejection bar 31 by an ejection motor. A small casting cavity 43 then remains between the seal surface 7a that surrounds the cavity 71, the seal surface 5a of the seal ring 5, the face 61a of the collar 61 of the collar ring 6 and the face 41a of the core 41, the casting cavity being in contact with the outer edge of the tray and encircling the tray annularly. When the molten plastic material is fed into this casting cavity 43, it forms a flange-like rim that extends outwards from the side walls of the tray. Due to its shape, the collar ring 6 is tightened against the forming core 41 to ensure the tightness of the casting cavity 43. The injection channel of the casting material is arranged through the mould frame 8 of the stationary mould half 20 and the plastic to be cast moves through there to the casting cavity 43. The injection channels can also be arranged to arrive in the injection cavity in another manner, depending on the structure of the container that is shaped.

After the molten plastic material has solidified in the casting cavity 43, the mould can be opened to its open position again. The ejection part 3 is then still in the rear position. When the ejection part 3 is pushed by the ejection rod 31 to the front position, it removes the finished container from the movable mould half 10 and, at the same time, the collar ring 6 can be moved to the front position again, i.e., the position shown in FIG. 3A is reassumed. The seal surface 7a of the mould plate 7 of the front mould 20 then works as ejection surface, against which the ejection bar 31 pushes, when the finished container is removed from the mould. After this, the robot takes the finished container out and replaces it with a new blank K, after which the working phases are repeated as above.

Figure 2C:
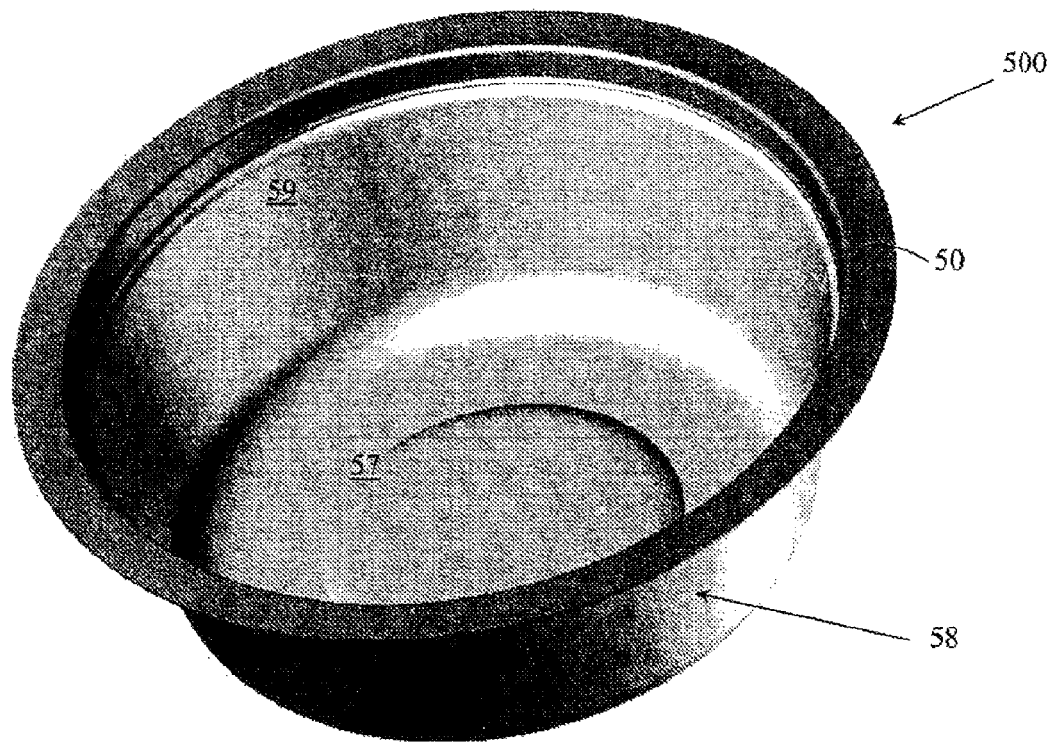
FIG. 2C shows a perspective view of a container provided by a known mould system.

By using as mould cavity, a cavity suitable for a container with a round bottom, and by adapting the shape of the moulding part of the forming core so as to suit the shape of the mould cavity in question, the mould system described above can be used to make, e.g., the container 500 shown in FIG. 2C, comprising a body 58 that is compression-moulded from cardboard blank and includes a round bottom 57 and upward extending walls 59 that are connected to the bottom 57. A flange-like plastic rim 50 extending outwards is cast to the upper edge of the walls 59.

Figure 4:
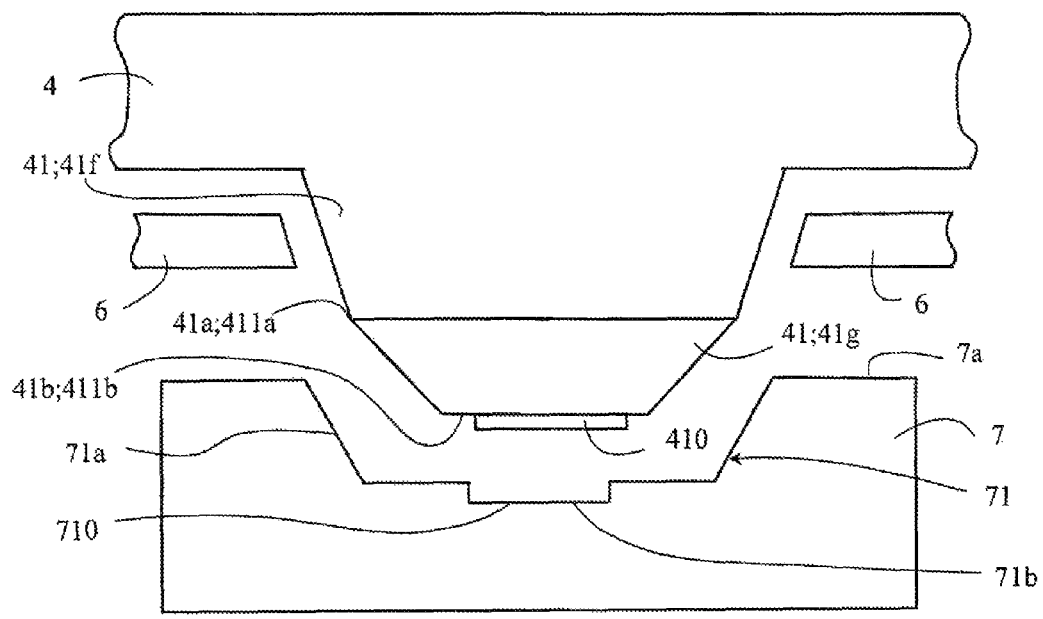
FIG. 4 shows a side view of the longitudinal section of the forming core and the mould cavity, each comprising an insert that shapes the container body.
Figure 5:
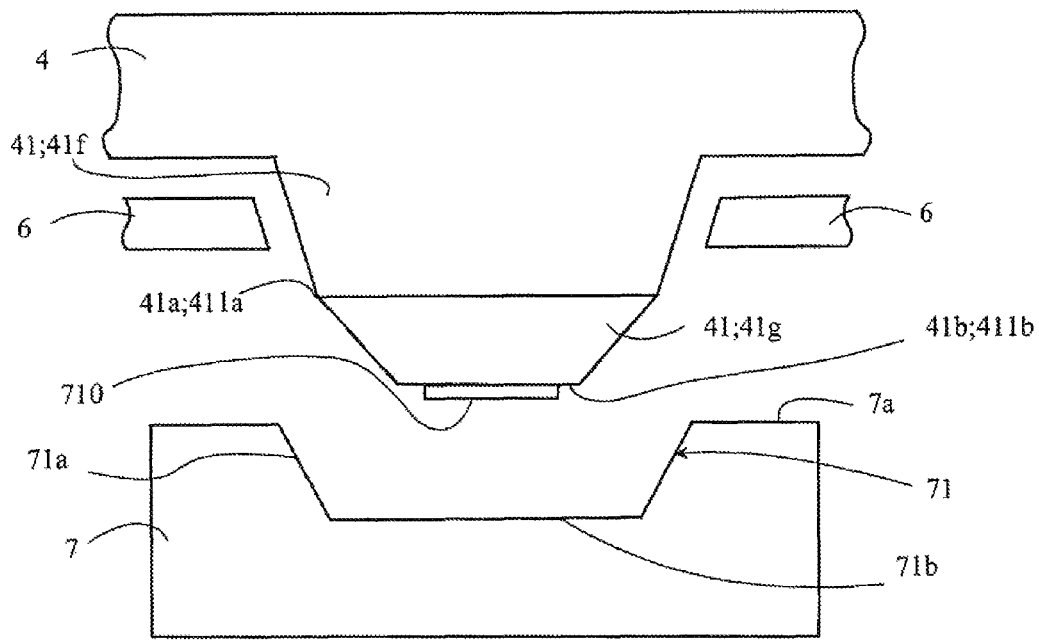
FIG. 5 shows a side view of the longitudinal section of the forming core and the mould cavity, only one of them comprising the insert that shapes the container body.

When the container shown in FIG. 2C is to be shaped by forming two-sided decorative or functional embossed or inlaid shapes to its body 58, which is pressed from cardboard blank, i.e., the bottom 57 or walls 59, this can be carried out by changing the forming core used in the mould system according to the invention and the corresponding mould cavity 71, according to FIG. 4. FIG. 4 shows schematically the forming core 41, which is attached, to the core plate 4 and consists of two parts; a basic part 41f, the length of which remains unchanged and which is attached to the core plate 4 of the forming core, and an attachment part 41g of the core, the length of which can be changed and which is attached to the said basic part. A projection 410 is connected to the outer edge 411b of the attachment part 41g, which at the same time works as the outer edge 41b of the core, the projection being used as an insert and directed downwards from the plane of the outer edge of the core, i.e., perpendicular to the direction of the plane of the seal surface 7a of the mould plate 7. FIG. 4 also shows the collar ring 6, which is located below the core plate 4 and surrounds the forming core 41. The attachment part 41g of the core 41 can be connected to the basic part 41f of the core at a desired spot but, generally, it is most preferable to form the core 41 so that the attachment part 41f constitutes the forming part of the core, i.e., the part that is fitted into the mould cavity 71, when the cardboard blank K is pressed to shape in the manner shown in FIGS. 3A-3C. The face 411a of the attachment then functions as the face 41a of the core and it will be flush with the seal surface 7a of the mould plate 7 or slightly above the same in the direction of the movable-mould half 10, when the core 41 is pressed into the mould cavity 71. The attachment part 41g of the core 41 is connected to the basic part 41f of the core by an appropriate fastening, such as a screw fastening. As the joint between the basic part 41f and the attachment part 41g of the core is not copied to the plastic rim of the container that is made, the mutual fastening of the attachment part 41g of the core and the basic part 41f of the core can also be implemented by other fastening methods that are known by those skilled in the art. In the pair of forming core and mould cavity according to FIG. 4, a recess 710 that corresponds to the projection 410 of the attachment part 41g of the core is now formed on the base 71b of the mould cavity 71 of the mould plate 7. In this case, the insert of the mould cavity 71 is, in fact, an insert, which is removed from the flat base 71b of the mould cavity and which can be reconnected to the bottom 71b, when a mould system according to FIG. 5 is to be formed, wherein the bottom 71b of the mould cavity 71 is flat and by which one-sided shapes are created to the body 58 of the container part that is formed from the cardboard blank. When the pair of forming core and mould cavity according to FIG. 4 is used in the manufacture of the container 500 in the manner illustrated earlier by FIGS. 1-3, the projection 410 of the core attachment part 41g is pressed to the bottom 71b of the mould cavity 71 at the compression stage, i.e., in the work phase shown above in FIGS. 3B and 3C. In that case, the projection 410 pushes the cardboard blank that lies between the forming core 41 and the mould cavity 71 towards the recess 710, which is on the bottom 71b of the mould cavity 71, has a slightly larger bottom area than the said projection and the same shape as the projection. Thus, the inner recess of the container is copied to the inner surface of the bottom 57 of the container 500 that is made; and a corresponding bulge that extends downwards from the rest of the bottom outer surface is copied to the outer surface of the bottom.

The forming core 41 shown in FIG. 5 and the mould cavity 71 opposite to it differ from the forming core according to FIG. 4 and the moulding cavity opposite the same only in that the bottom of the mould cavity 71b is now even. The base is either not provided with the insert 710 that deepens the base, or the detachable insert 710 of the base of the mould cavity is re-attached to the base. When the pair of forming core and mould cavity according to FIG. 5 is used in the manufacture of the container 500, the projection 410 of the core attachment part 41g is pressed to the bottom 71b of the mould cavity 71 at the compression stage and the projection 410 pushes the cardboard blank K that is between the forming core 41 and the moulding cavity 71 towards the even bottom 71b of the mould cavity 71 in the manner illustrated in FIGS. 3A-3B. The recess is copied only to the inner surface of the bottom 57 of the container 500 that is made and the outer surface of the bottom 71b remains flat.

Figure 6:
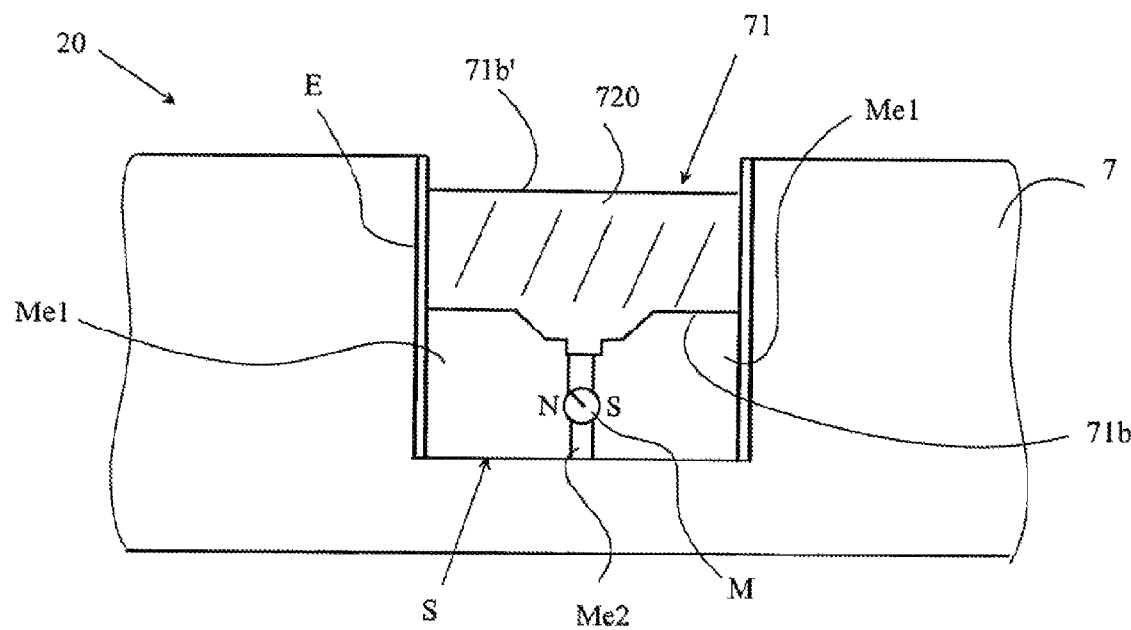
FIG. 6 shows a top view of the cross section of the mould plate, an insert being attached to its mould cavity by a magnetic system to change the depth of the container.

FIG. 6 shows an embodiment of the invention which changes the depth of the container 500 that is pressed form the cardboard blank, i.e., the distance of the container bottom from the upper edge of its walls by arranging on the base 71b of the mould cavity 71, a detachable insert 720 that reduces the depth of the mould cavity 71.

FIG. 6 shows the mould plate 7, wherein the detachable insert 720 is attached on top of the base of the mould cavity 71. The upper edge of the mould cavity, i.e., the upper surface (seal surface) of the mould plate 7 is at the height H from the plane defined by the base 71b, which is also the greatest depth of the mould cavity. The bottom of the insert 720 is supported on the base 71b. When a new insert (spacer) is added onto the base 71b of the mould cavity, its height being h, the upper surface 71b of the insert 720 works as the new bottom 71b of the mould cavity. The bottom of the insert 720 is supported to the base 71b. When a new insert (spacer) is added onto the base 71b of the mould cavity, its height being h, the upper surface 71b of the insert 720 works as the new bottom 71b of the mould cavity, thus reducing the depth of the mould cavity from the depth H into a new depth H-h. The shape of the insert in FIG. 6 enables it to be fitted tightly onto the base of the mould cavity, filling completely the space defined by the base 71b and the walls 71a in the lower part of the mould cavity 71, up to the height h of the mould cavity from the plane defined by the base. The upper surface 71b of the insert is continuous and planar, whereby it can be used as the new bottom of the mould cavity. The continuous upper surface of the insert could also have a downwards concave or upwards convex shape, if this were appropriate regarding the shape of the bottom 57 of the intended container.

When the depth of the mould cavity 71 is reduced by the insert 720, so that the new depth of the mould cavity 71 is H-h, the length of the core attachment part 41g, which is connected to the end of the basic part 41; 41f of the core, which does not change its length, is reduced by the height h of the insert 720 that is placed on the bottom of the mould cavity 71. Then, the length of the forming part of the core, which penetrates inside the mould cavity at the compression stage of the cardboard according to FIG. 3B, is H-h.

Then, the core consists of the basic part 41; 41f and the attachment part 41g that can be connected on top of the basic part. In this way, the length of the forming part of the core can be changed by correspondingly changing, with respect to each other, the length of the core basic part 41f that does not change its length and the length of the core attachment part 41g that changes its length and is connected on top of the basic part of the core. In this way, the surface area of the tray bottom among others, can be kept as before regardless of the changes in the depth of the tray.

The insert 720 shown in FIG. 6, which is attached at the bottom 71b of the mould cavity 71, is connected detachably to the bottom 57 of the mould cavity by means of a magnet system S containing a permanent magnet M. Other detachable fastening methods, such as a screw fastening, can also be used. In the magnet system S, an insulation E that surrounds the permanent magnet M and the magnetizable insert 720 is formed in the mould cavity 71. Alternatively, the magnet system S can be insulated by non-magnetizable insulation pieces that surround the same, whereby the insert 720, in turn, can be coated with a non-magnetizable coating on surfaces other than the one directed towards the magnet system S. This solution provides the advantage that the magnetic field of the magnetizable insert does not impede the operation of the mould, when it is coated with the non-magnetizable coating on sides other than the one turned to the magnet.

The magnet system S consists of a magnetizable metal, herein two iron sheets Me1, which are on both sides of a non-magnetic metal (Me2), and a permanent magnet rod M with a round cross sectional profile, which is fitted into an opening in the non-magnetizable metal sheet Me2, such as aluminium. When the magnet M is turned in the opening, the magnetic field generated by it changes. When the magnet is turned so that the magnetic field moves in the direction of the iron sheets Me1, they prevent the action of the magnet and the magnetic field does not move through the insert 720. The magnet is then in the off position. When the permanent magnet rod M is turned in the opposite direction, the magnetic field moves towards the iron sheets Me1 through the non-magnetic metal Me2, whereby the iron sheets Me1 enhance the magnetic field and the magnet is in the on position. By turning the permanent magnet rod in the opening that is in the non-magnetic metal Me2, so that the magnetic field is in the off position, the insert 720 can be quickly replaced with another. By turning the magnet back to the on position, the insert 720 can be attached to the bottom 71b of the mould cavity 71.

Only a few embodiments of the invention are described above and it is obvious to those skilled in the art that the invention can be implemented in various other ways within the scope of the invention disclosed in the claims.

Accordingly, the permanent magnets can also be used without the insulation of the mould cavity, if the insert placed on the base of the mould cavity and, thus, also the permanent magnet are relatively small.

Thus, in the embodiments of the invention according to FIGS. 4 and 5, the entire core 41 that is on the core plate 4 can be replaced. In that case, the projection 410 of the core 41, which is used as insert in FIGS. 4 and 5, is attached to the outer edge 41b of the actual forming core 41. Similarly, even though in the embodiment of the invention illustrated in FIGS. 4 and 5, the attachment part 41g of the core 41 is provided with the projection 410 and the bottom 71b of the mould cavity 71 is provided with the recess 710 that corresponds to the said projection 410, the same end result is obtained by providing the bottom 71b of the mould cavity 71 with an upwards extending projection and the outer edge 411b of the attachment part 41g of the mould core 41 with a corresponding recess. The length of the core 41 that is replaced in the core plate in FIG. 6, is adapted to the changes in the depth of the mould cavity, so that the length of the core part that penetrates inside the mould cavity at the compression stage of the cardboard blank is the same as the depth H-h of the mould cavity provided with the insert.

The walls 59 of the container 500 can also be provided with various functional or decorative, one or two-sided embossed or inlaid shapes. In that case, the bulges and recesses are placed on the walls of the core 41 or its attachment part 41g and/or on the walls 71a of the mould cavity instead of the outer end of the core and the bottom 71b of the moulding cavity.

The invention claimed is:

1. A mould system for manufacturing a cardboard-based container, comprising
    a movable mould half and a stationary mould half, which are located opposite to each other,
    the mould system enabling the manufacture of a container, which comprises a bottom that is pressed from a cardboard blank and walls that are connected to the bottom, and a rim that is at least partly cast of plastic and connected to the upper edge of the walls, encircling the walls, whereby
    the mould half that is movable with respect to the stationary mould half includes at least a core plate provided with a core, a plate-like seal ring, which is movable with respect to the core and comprises a shut-off surface and surrounds the core, and a collar ring, which can be adapted between the core and the seal ring and by which the rim can be made on the container and which can be moved with respect to both the seal ring and the core; and the stationary mould half includes at least a mould plate that is provided with a mould cavity and a seal surface, characterized in that in the mould system, when the mould is closed, a common seal surface is formed by the seal surface, which operates as a shut off surface, of the seal ring and the face of the seal surface of the collar, so that said seal surface of the seal ring and face of the seal surface of the collar are brought into flush contact with one another, an insert can be supported on and detachably attached to the base of the mould cavity, which has its upper surface at the height H from the base of said mould cavity, wherein said insert reduces the depth H of the mould cavity by its height h, so that the continuous surface of the insert works as the new bottom of the mould cavity and that the length H of the part of the core that penetrates inside the mould cavity at the compression stage of the cardboard blank can be reduced, respectively, by the height h of the insert either by replacing the core on the core plate with a shorter one or by detachably attaching, to the basic part of the core that does not change its length, an attachment part, the length of which can be changed, whereby the core or the attachment parts of the core and the inserts of the base of the mould cavity, which correspond to each other, can be used to change the distance of the container bottom, which is pressed from the cardboard blank, from the upper edges of the container walls.

2. A mould system according to claim 1, characterized in that an insert can be detachably attached to the base of the mould cavity, the height of the insert being h and it having a shape that can be adapted tightly to the lower part of the moulding cavity, which is limited by the base of the mould cavity and the walls that are connected to the base of the mould cavity; the insert enabling a reduction in the distance between the rim and the bottom of the container, the container comprising a bottom that is pressed from a cardboard blank and walls that are connected to the bottom, the rim being at least partly cast of plastic and connected to the upper edge of the walls, encircling the walls.

3. A mould system according to claim 1 or 2, characterized in that the insert can be magnetically attached to the bottom of the mould cavity.

4. A mould system according to claim 3, characterized in that the insert can be attached to the base of the mould cavity by a permanent magnet which can be turned in a direction so that its magnetic field moves in a direction of iron sheets which prevents the magnetic field from moving through the insert, whereby an insert can be replaced with another insert, and which permanent magnet can be turned in a direction in which the magnetic field moves towards the iron sheets, whereby the iron sheets enhance the magnetic field and the insert is held in place, so that the magnetic field of the permanent magnet can in effect be switched on and off with respect to said insert.

5. A mould system according to claim 3, characterized in that the insert can be attached to the base of the mould cavity by means of a magnet system containing a permanent magnet, and an insulation surrounding the permanent magnet and the magnetizable insert is formed in the mould cavity in the magnet system.

6. A mould system according to claim 5, characterized in that the magnet system consists of a magnetizable metal, which is on both sides of a non-magnetic metal, and a permanent magnet rod, which is fitted into an opening in the non-magnetizable metal sheet.

7. A mould system according to claim 2, characterized in that the core consists of a basic part, the length of which does not change, and an attachment of the core, which can be connected on top of the said basic part, and that the length of the forming part of the core can be changed by changing the length of the core attachment that is added on top of the basic part of the core.

8. A mould system according to claim 1, characterized in that an insert can be attached to the bottom of the mould cavity, which insert can be used to reduce or increase the distance of the container bottom that is pressed from the cardboard blank from the upper edges of the container walls, so that the container bottom area remains unchanged.

9. A method of manufacturing a container that has a cardboard-based body by the mould system according to claim 1, characterized in that a cardboard blank is pressed between a forming core and a mould cavity to provide a container bottom and walls that encircle the bottom, after which a flange-like rim, which encircles the walls and at least partly consists of plastic is formed by casting on the upper edge of the walls and, furthermore, the insert attached to the bottom of the mould cavity and/or to the core and the attachment connected to the basic part of the core are used to change the distance of the container bottom, which is pressed from the cardboard blank, from the upper edges of the container walls.

10. A method according to claim 9, characterized in that the cardboard blank is retained between the seal surface of the seal ring and the seal surface of the collar ring and the seal surface of the mould plate opposite the same at least until the cardboard blank has slid into the mould cavity and a casting cavity is not provided in the mould system until after this for forming the flange-like rim that encircles the container walls and at least partly consists of plastic.

* * * * *